June 13, 1961
H. M. FOX
2,987,873
METHOD AND APPARATUS FOR USING AMMONIA TO
INCREASE THE AIR SPECIFIC IMPULSE OF A
TWO-STAGE COMPRESSOR TURBOJET ENGINE
Filed May 13, 1955
3 Sheets-Sheet 1
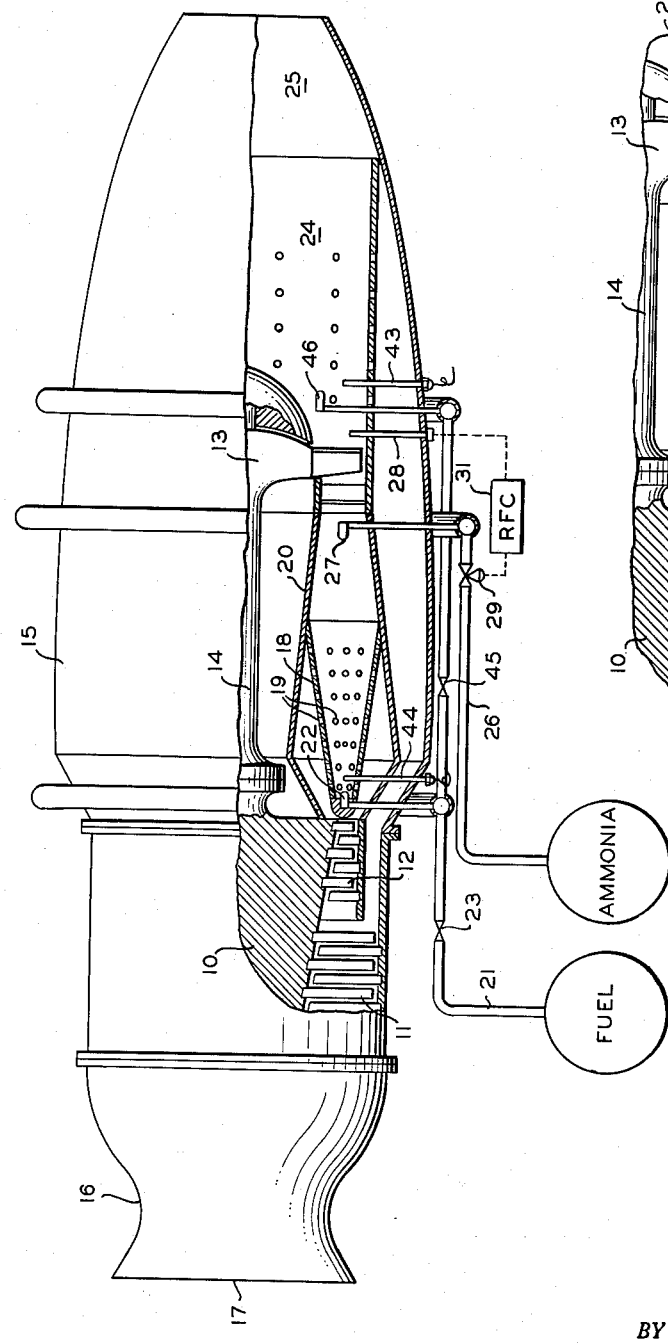
FIG. I.
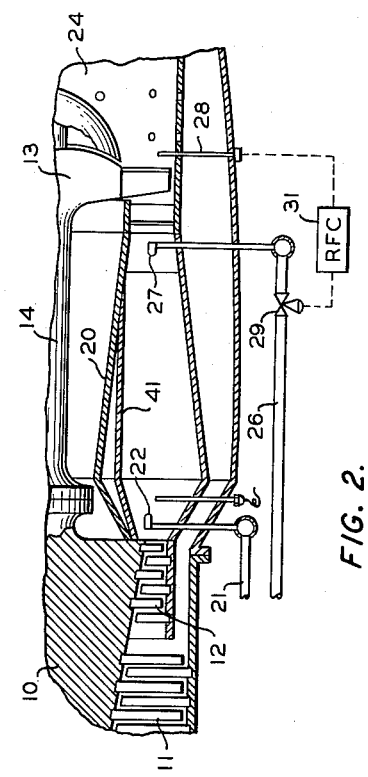
FIG. 2.
INVENTOR.
H. M. FOX
BY Hudson and Young
ATTORNEYS

2,987,873
METHOD AND APPARATUS FOR USING AMMONIA TO INCREASE THE AIR SPECIFIC IMPULSE OF A TWO-STAGE COMPRESSOR TURBOJET ENGINE

Homer M. Fox, Bartlesville, Okla., assignor to Phillips Petroleum Company, a corporation of Delaware
Filed May 13, 1955, Ser. No. 508,106
4 Claims. (Cl. 60—35.3)

This invention relates to continuous combustion power plants. In one aspect it relates to a method for increasing the air specific impulse in a ducted fan engine. In another of its aspects it relates to a method for utilizing ammonia to control the temperature of the combustion gases passing through the turbine of a ducted fan engine.

One form of ducted fan jet engine comprises an air inlet section, a primary combustion chamber utilizing second compression stage air, a turbine section, a secondary combustion chamber utilizing first compression stage air, and an exhaust nozzle section. Therefore, a ducted fan jet engine is a modified turbojet engine wherein two air compression stages are utilized and the high compression stage air is utilized to burn fuel in the primary combustion zone and to quench the combustion products to a temperature suitable to pass through the turbine, and wherein the low compression stage air is introduced into the secondary combustion chamber, or afterburner, so as to burn fuel added downstream from the turbine. In such a ducted fan jet engine, the fuel burned in the primary combustion chamber is usually only that required to operate the turbine and compressor and the major portion of thrust is obtained by burning fuel in the afterburner with low compression stage air.

I have discovered that injection of anhydrous ammonia into the primary combustion zone of a ducted fan engine immediately upstream from the turbine provides a simple and efficient method for controlling the temperature of the combustion gases entering the turbine and in addition provides a source of fuel downstream from the turbine for combustion with the air which by-passes the turbine. In this manner, the material which has been used as coolant for the combustion gases entering the turbine is utilized for combustion downstream from the turbine where the combustion temperature is not limited by the turbine structure. Also, by operating a ducted fan engine in this manner, only sufficient high compression stage air to provide a stoichiometric fuel-air mixture in the primary combustion chamber is required. The air specific impulse of an engine operated according to the process of this invention increases with increasing compression ratios up to compression ratios of 20:1 and higher.

Air specific impulse is the ratio of thrust to rate of air consumption, i.e., air specific impulse=thrust/rate of air consumption.

Fuel specific impulse is the ratio of thrust to rate of fuel consumption, i.e., fuel specific impulse=thrust/rate of fuel consumption.

It is an object of this invention to provide an improved method for operating a ducted fan engine at an extremely high level of thrust without overheating the turbine.

It is also an object of this invention to provide a ducted fan engine which operates at a higher air specific impulse value than has heretofore been achieved.

Another object is the provision of a method for quenching primary combustion chamber gases in a ducted fan engine with anhydrous ammonia.

It is another object of this invention to provide a method for operating a ducted fan engine so as to obtain high air specific impulse.

It is still another object of this invention to provide a ducted fan engine wherein the primary combustion chamber is employed to produce sufficient energy for driving the turbine and the two-stage compressor and wherein a secondary combustion chamber is employed downstream from the turbine to burn hydrogen, which results from the decomposition of ammonia injected into the primary combustion chamber as coolant, at a high level of temperature in air supplied by the low pressure stage of the compressor so as to develop the major portion of thrust developed by the engine.

Other and further objects and advantages of this invention will be apparent to one skilled in the art upon study of the disclosure of the invention and the appended drawing wherein:

FIGURE 1 is a partially sectioned elevation of one embodiment of the invention,

FIGURE 2 is a modification of the invention,

Figure 3:
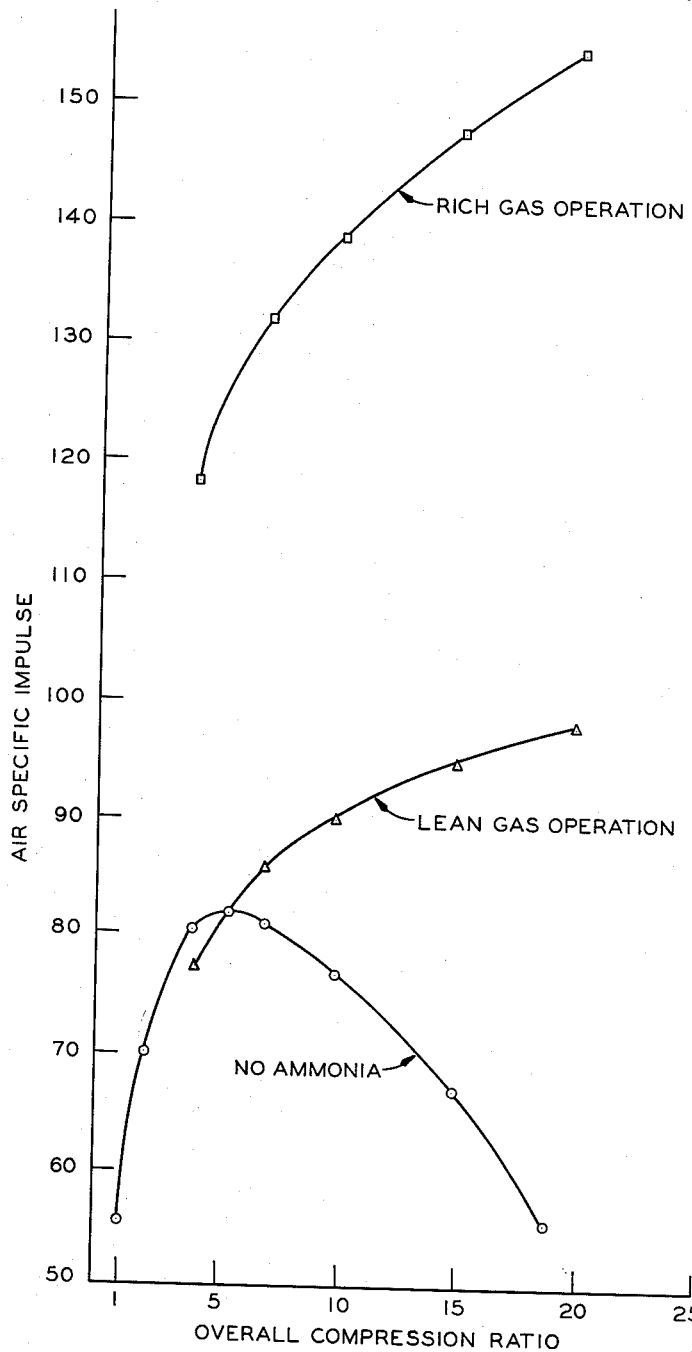
FIGURE 3 is a graph of air specific impulse values of a ducted fan engine.

Broadly speaking, the invention relates to a ducted fan engine and to a method for utilizing anyhdrous ammonia as coolant for the combustion gases entering the turbine and then burning the hydrogen, resulting from the decomposition of ammonia, or ammonia downstream from the turbine for the major portion of the thrust developed by the engine. I have found that anhydrous ammonia is an excellent cooling medium for quenching the combustion gases in the combustion chamber of a ducted fan engine because the ammonia is decomposed primarily into elemental nitrogen and hydrogen at the conditions existing in the combustion chamber and provides low molecular weight gases advantageous to the operation of the turbine, in addition to cooling the combustion gases prior to their entry into the turbine and providing high flame speed components for combustion downstream of the turbine. I have found that operation of a ducted fan engine according to the method of this invention provides a surprising increase in the air specific impulse attained by the engine. The use of ammonia as coolant and as a source of additional fuel makes possible higher compression ratios, and in turn, higher compression ratios provide greater thrust from the engine.

As an example of a jet engine applicable to this invention, reference is made to FIGURE 1 which illustrates a ducted fan or two-stage compressor jet type engine comprising an axial flow compressor 10 having a low pressure section 11 and a high pressure section 12, an axial flow turbine 13 axially spaced from and drivingly connected with the adjacent end of the compressor 10 by means of shaft 14, and outer casing or cowling 15 which in conjunction with a reduced cowling nose 16 provides an annular air inlet 17. Air is supplied from the high pressure section 12 of compressor 10 to flame tube 18 of the primary combustion chamber 20 through apertures 19 located in the forward end of flame tube 18. Fuel is supplied to flame tube 18 through fuel conduit 21 and fuel nozzle 22. The flow of fuel to flame tube 18 is controlled by valve 23. By this method of dividing the air into two portions, the engine can be operated over a wide range of speeds at or near the optimum fuel-air ratio in the primary combustion chamber. The products of combustion are exhausted from flame tube 18 through turbine 13 to afterburner or secondary combustion chamber 24 and exhaust nozzle 25. Ammonia is injected into combustion chamber 20 substantially immediately upstream from turbine 13 through ammonia line 26 and nozzle 27. The amount of ammonia injection is controlled by thermocouple 28 positioned adjacent turbine 13 and operatively connected with control valve 29 through rate of flow controller 31.

The rate of flow controller is adjusted so as to provide a quantity of ammonia to flame tube 18 immediately upstream from turbine 13 so that the temperature of the combustion gases passing through the turbine 13 is maintained below a predetermined maximum temperature level as determined by thermocouple 28. All the fuel for combustion in the engine, including that required in afterburner 24, is preferably introduced into combustion chamber 20. When conditions warrant extra thrust or when temperatures in the afterburner are not excessive, fuel can be added to the afterburner through valve 45 and nozzle 46. The high level of combustion in flame tube 18 is quenched by ammonia introduced into the combustion chamber 20 substantially immediately upstream from the turbine 13. The ammonia serves the dual function of acting as a coolant for combustion gases entering the turbine and at the same time is transformed into a rich fuel mixture containing hydrogen as a high flame speed component. This mixture, which is in vaporized form, is exhausted from turbine 13 and burned in afterburner 24 so as to develop a major portion of the thrust of the engine, without overheating turbine 13.

As an example of a modification of a jet engine applicable to this invention, reference is made to FIGURE 2 wherein flame tube 41 of the combustion chamber is modified so that air from high stage compressor 12 passes directly into the forward end of flame tube 41 instead of through perforations around the periphery of the flame tube. This configuration makes possible the use of a combustion chamber of shorter length since combustion is initiated at substantially the forward end of the flame tube.

Ignition of the combustible mixture in the secondary combustion chamber can be initiated with a conventional ignition means 43 which can be the same type as the ignition means 44 in the primary combustion chamber.

A better understanding of the operation of this invention may be had by reference to the following examples which are presented for the purpose of illustrating but should not be construed as limiting the invention.

Example I

In a ducted fan jet engine substantially as illustrated in FIGURE 1 of the drawing, a substantially stoichiometric ratio of fuel and high pressure stage compression air is burned in the primary combustion chamber. The combustion temperature in the primary combustion zone is about 5000° R. The thermocouple adjacent the turbine actuates the rate of flow controller, which in turn controls the injection of ammonia into the primary combustion chamber adjacent the turbine, so as to maintain the temperature of the gases passing through the turbine at about 1960° R. The air from the low stage of compression is introduced into the secondary combustion chamber downstream from the turbine and the hydrogen derived from the decomposition of the ammonia is burned in the secondary combustion zone wherein the temperature is raised to about 3000° R. before entering the nozzle. Thus the fuel burned in the primary combustion zone is utilized principally for the operation of the compressor and the majority of the thrust of the engine is derived from burning hydrogen in the secondary combustion chamber.

The compression ratio of the low stage of compression is about 6.59:1 and the overall compression ratio is about 20:1.

The thermocouple, as shown in the drawing, can be downstream from the turbine or it can be positioned upstream from the turbine since the temperature of the gases passing through the turbine can be determined so long as the thermocouple is positioned reasonably close to the turbine and temperature drop of the gases across the turbine is considered. The thermocouple should be shielded against radiant heat, in any case.

Example II

In a ducted fan engine all the air is compressed by the low stage compressor and just enough of the air to maintain operation of the turbine is compressed further in the second stage compressor. A stoichiometric mixture of normal heptane and air is burned in the primary combustion chamber. The temperature of the gases entering the turbine is 1960° R. Combustion occurs in the afterburner and is controlled to maintain a temperature of 3000° R. at the exhaust nozzle. Two systems are compared: (1) overall fuel-air ratio in the primary combustion chamber sufficient to maintain the temperature of the gases entering the turbine at 1960° R., and (2) stoichiometric fuel-air ratio in the primary combustion chamber with cooling of the combustion gases by injecting sufficient ammonia to maintain the temperature of the combustion gases entering the turbine at 1960° R. In both systems exhaust from the turbine is mixed with by-pass air in the secondary combustion chamber and additional fuel is burned so as to raise the temperature of the gases at the exhaust nozzle at 300° R. In (1) normal heptane is injected into the secondary combustion chamber, and in (2) decomposition products of ammonia are burned as the fuel in the secondary combustion chamber.

In comparing the two systems, the following assumptions have been adopted:

Speed=1000 ft./sec.
$D$=efficiency of diffuser=0.95
$c$=efficiency of compressor=0.80
$t$=efficiency of turbine=0.85
$n$=efficiency of nozzle=0.96
$B$=combustion efficiency=1.00
$T$=1960° R., $T_0$=519

Two systems of operation are presented for ammonia injection. In the first system the amount of by-pass air is sufficient to maintain the temperature of the combustion gases at 3000° R. when only part of the decomposition products of ammonia are burned in the afterburner. This is called rich gas operation and provides the maximum air specific impulse for the engine.

The second system of operation is operated with more by-pass air and the by-pass air is sufficient both to burn all of the ammonia decomposition products in the afterburner and also to cool the products to 3000° R. at the exhaust nozzle. This is called lean gas operation and provides a smaller air specific impulse than rich gas operation. In the following Table I values of specific impulse are presented as derived from calculations based on the values hereinabove presented.

TABLE I

| Overall Compression Ratio | No Ammonia Injection | | | Lean Gas Oper'n | | | Rich Gas Oper'n | | |
|---|---|---|---|---|---|---|---|---|---|
| | CR[1] | $I_a$[2] | $I_f$[3] | CR[1] | $I_a$[2] | $I_f$[3] | CR[1] | $I_a$[2] | $I_f$[3] |
| 1 | 1.00 | 55.6 | 1,480 | | | | | | |
| 2 | 1.39 | 69.7 | 1,856 | | | | | | |
| 4 | 1.75 | 80.0 | 2,130 | 1.92 | 77.0 | 916 | 2.60 | 118.2 | 556 |
| 5.5 | 1.80 | 81.4 | 2,168 | | | | | | |
| 7 | 1.77 | 80.6 | 2,147 | 2.39 | 85.4 | 1,009 | 3.75 | 131.6 | 627 |
| 10 | 1.63 | 76.7 | 2,032 | 2.71 | 89.7 | 1,051 | 4.57 | 138.8 | 661 |
| 15 | 1.30 | 66.8 | 1,779 | 3.10 | 94.3 | 1,094 | 5.66 | 147.4 | 698 |
| 18.9 | 1.00 | 55.6 | 1,480 | | | | | | |
| 20 | | | | 3.42 | 97.5 | 1,125 | 6.59 | 153.9 | 727 |

[1] First stage compression ratio.
[2] Lb.-sec./lb. air=air specific impulse.
[3] Lb.-sec./lb. heptane plus ammonia=fuel specific impulse.

Examination of Table I shows that ammonia injection permits operation at higher pressure levels, with correspondingly greater air specific impulse.

FIGURE 3 shows the increase in air specific impulse obtained with ammonia injection. It should be noted that lean gas operation provides an improvement in air specific impulse although of considerably lesser magnitude than does rich gas operation.

Figure 4:
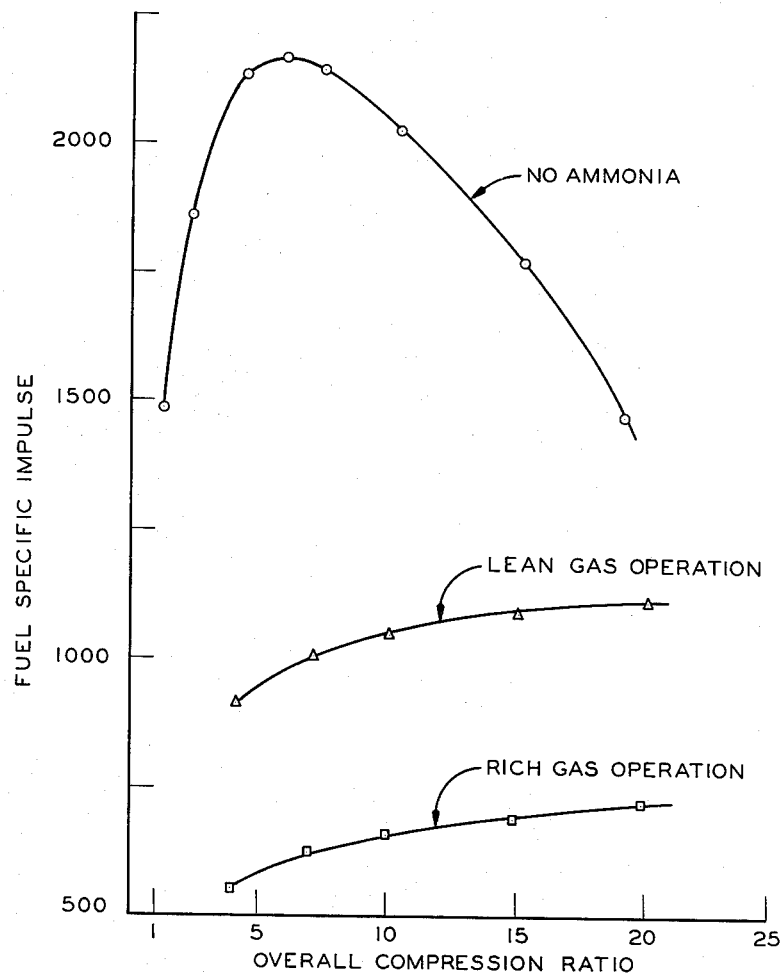
FIGURE 4 is a graph of fuel specific impulse values of a ducted fan engine.

FIGURE 4 shows that a loss in fuel specific impulse accompanies the increase in air specific impulse, however, this figure also demonstrates that with higher overall compression ratios the fuel specific impulse with ammonia injection approaches that of operation with no ammonia injection. This is particularly true of lean gas operation where it would appear that the fuel specific impulse for the two systems would be substantially the same at an overall compression ratio of about 22.5:1.

The fuel specific impulse obtained with ammonia injection is less than that obtained in a conventional ducted fan engine which uses additional fuel in the afterburner because the heat content of liquid ammonia is considerably less than the heat content of a liquid hydrocarbon fuel. Investigations have shown however, that increasing the compression ratios of the engine increases the fuel specific impulse obtained with an engine using ammonia injection and as compression ratios are increased, the fuel specific impulse obtained with ammonia injection approaches that of an engine without ammonia injection.

Reasonable variations and modifications are possible within the scope of the disclosure of the invention, the essence of which is a method of cooling combustion gases entering the turbine of a ducted fan engine and concomitantly providing a high specific impulse fuel for combustion in the afterburner comprising utilizing ammonia as combustion gas coolant.

That which is claimed is:

1. In the operation of a ducted fan jet engine comprising in serial relationship a compression zone, a combustion zone, a turbine zone and a thrust zone, wherein air is compressed, a first portion of said compressed air is utilized to burn fuel in said combustion zone, the combustion products are passed through the turbine zone to the thrust zone, and a second portion of said compressed air is introduced downstream from the turbine zone of said engine, the improvement comprising utilizing said first portion of compressed air to burn at least a stoichiometric amount of fuel in said combustion zone; adding ammonia to combustion products in said combustion zone to cool said combustion products; and burning said ammonia and decomposition products of ammonia present in said combustion products in the air introduced downstream from the turbine zone.

2. An improved method for producing thrust comprising compressing air; passing a portion of said compressed air to a primary combustion zone; burning a stoichiometric mixture of air and fuel in said combustion zone; introducing ammonia into combustion products in said combustion zone; passing a resulting mixture of combustion products, ammonia and decomposition products of ammonia through a turbine zone to a secondary combustion zone; passing remaining compressed air to said secondary combustion zone; burning hydrogen derived from said ammonia in said secondary burner; and exhausting the total products of combustion through an exhaust zone so as to provide thrust.

3. In the operation of a ducted fan jet engine wherein fuel is introduced into a combustion zone, air is compressed in a compressor zone, a first portion of compressed air is utilized for burning fuel in said combustion zone, combustion products are passed through a turbine zone to a thrust zone, and remaining compressed air is passed to said thrust zone, the improvement comprising introducing said fuel into said combustion zone in at least the stoichiometric ratio with respect to the air introduced into said combustion zone; introducing ammonia to said combustion zone substantially immediately upstream from said turbine zone as the sole coolant for combustion products; and burning hydrogen derived from said ammonia in said thrust zone.

4. A method for operating a ducted fan jet engine at compression ratios including 20/1 and higher at increasing values of air specific impulse and fuel specific impulse, which comprises compressing air in a first stage of compression; passing a first portion of said compressed air to a second stage of compression; passing air from the second stage of compression to a primary combustion zone; passing fuel to said combustion zone in an amount at least sufficient to combine with all of the oxygen of the air in said combustion zone; burning the resulting fuel and air in the primary combustion zone and passing combustion products through a turbine zone to a secondary combustion zone, said fuel and air being supplied to said primary combustion zone in an amount sufficient to operate said turbine zone and said two stages of compression; introducing ammonia into the combustion products in said primary combustion zone upstream from and adjacent to said turbine zone in an amount sufficient to lower the temperature of the combustion gases to a predetermined value; passing the remaining portion of air from said first stage of compression to said secondary combustion zone; burning said ammonia and decomposition products of ammonia in said air in said secondary combustion zone; and exhausting the total products of combustion through an exhaust zone so as to provide thrust.

References Cited in the file of this patent

UNITED STATES PATENTS

| | | |
|---|---|---|
| 991,179 | Stodola | May 2, 1911 |
| 1,688,761 | Sperry | Oct. 23, 1928 |
| 2,365,616 | Zweifel | Dec. 19, 1944 |
| 2,464,724 | Sedille | Mar. 15, 1949 |
| 2,520,967 | Schmitt | Sept. 5, 1950 |
| 2,559,814 | Whittle | July 10, 1951 |
| 2,589,074 | Goodwin | Mar. 11, 1952 |
| 2,636,344 | Heath | Apr. 26, 1953 |
| 2,643,511 | Briggs | June 30, 1953 |
| 2,653,446 | Price | Sept. 29, 1953 |
| 2,676,456 | Holzwarth | Apr. 27, 1954 |
| 2,688,843 | Pitt | Sept. 14, 1954 |
| 2,697,910 | Brozozowski | Dec. 28, 1954 |
| 2,872,782 | Johnson et al. | Feb. 10, 1959 |